(12) United States Patent
Oisel et al.

(10) Patent No.: US 8,170,397 B2
(45) Date of Patent: May 1, 2012

(54) DEVICE AND METHOD FOR RECORDING MULTIMEDIA DATA

(75) Inventors: Lionel Oisel, Pleumeleuc (FR); Izabela Grasland, Breteil (FR); Ewa Kijak, Dinge (FR); Francois Le Clerc, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 1323 days.

(21) Appl. No.: 11/630,177

(22) PCT Filed: Jun. 22, 2005

(86) PCT No.: PCT/EP2005/052907
§ 371 (c)(1),
(2), (4) Date: Dec. 19, 2006

(87) PCT Pub. No.: WO2006/003101
PCT Pub. Date: Jan. 12, 2006

(65) Prior Publication Data
US 2008/0025689 A1    Jan. 31, 2008

(30) Foreign Application Priority Data
Jul. 1, 2004 (FR) ..................................... 04 51382

(51) Int. Cl.
*H04N 5/93* (2006.01)
*H04N 5/92* (2006.01)

(52) U.S. Cl. ........................................ 386/286; 386/326

(58) Field of Classification Search ................... 386/286, 386/288, 323, 326, 332, 210, 224
See application file for complete search history.

(56) References Cited

U.S. PATENT DOCUMENTS

| 5,708,767 | A | 1/1998 | Yeo et al. |
| 5,956,026 | A | 9/1999 | Ratakonda |
| 2003/0120871 | A1* | 6/2003 | Ayaki et al. ................... 711/137 |
| 2006/0106816 | A1* | 5/2006 | Oisel et al. ................... 707/100 |

FOREIGN PATENT DOCUMENTS

| EP | 1215677 | 6/2002 |
| EP | 1388858 | 1/2004 |
| EP | 1388858 | 2/2004 |
| FR | 2846502 | 4/2004 |
| JP | 7-045050 | 2/1995 |
| JP | 10-234007 | 9/1998 |
| JP | 2001-111953 A * | 4/2001 |
| JP | 2001-527304 | 12/2001 |

OTHER PUBLICATIONS

U.S. Appl. No. 10/532,282 corresponds to FR2846502.
Search Report Dated Sep. 12, 2005.

* cited by examiner

*Primary Examiner* — Robert Chevalier
(74) *Attorney, Agent, or Firm* — Tutunjian & Bitetto, P.C.

(57) ABSTRACT

The invention relates to a device and a method for recording multimedia data received in programme form. The device comprises temporary storage device designed to continuously record the multimedia data received in programme form and permanent storage device, capable of selectively transferring programmes from the temporary storage device to the permanent storage device.

9 Claims, 1 Drawing Sheet

DEVICE AND METHOD FOR RECORDING MULTIMEDIA DATA

CROSS REFERENCE TO RELATED APPLICATIONS

This application claims the benefit, under 35 U.S.C. 365 of International Application PCT/EP05/052907, filed Jun. 22, 2005, which was published in accordance with PCT Article 21(2) on Jan. 12, 2005 in English and which claims the benefit of European patent applications No. 0451382, filed Jul. 1, 2004.

BACKGROUND OF THE INVENTION

1. Field of the Invention

The invention relates to a device and a method for recording multimedia data received in programme form.

The invention relates more specifically to the recording of video programmes in devices such as digital decoders and playing back these programmes.

2. Description of Related Art

Personal video recorders (PVR) have various recording and delayed playback functionalities. The PVRs are equipped with storage means for recording several hours of video, such as hard disks, for example. In addition to the high-capacity storage means, these devices also have sophisticated video data handling functionalities.

Such devices can also be used by a user to view a programme and then record it retroactively if the programme appears to be of interest. The data is recorded continuously and, when the users decide to retain it permanently, the data is stored permanently. This can apply to films where the user may be interested in all of the film and not a specific part.

The existing devices allow the user to record a programme offline from its beginning but are not suited to subsequently recording certain parts of programmes according to their content.

Such a functionality would be particularly useful in the context, for example, of sporting events where certain actions are more interesting than others or in the context of televised news or reports where only certain documents are of interest to each user according to their individual interests.

SUMMARY OF THE INVENTION

To this end, the invention relates to a device for recording multimedia data received in programme form comprising temporary storage means designed to record continuously the multimedia data received in programme form and permanent storage means, comprising means of selectively transferring programmes from the temporary storage means to the permanent storage means. According to the invention, the device comprises:
  segmentation means for segmenting the received programmes into units,
  means of selectively transferring one or more units from the temporary storage means to the permanent storage means.

The segmentation means can be used to break down the video programmes into units and so offer the user a finer granularity so that he can select not the total content from the temporary storage memory but fragments of this content.

According to a preferred embodiment, the segmentation means are designed to segment the programmes into hierarchically organized units.

This advantageously enables the user to understand the structure of the programme and browse easily.

According to a preferred embodiment, the segmentation means generate, for each unit, segmentation information comprising:
  a start address and an end address of the unit in the temporary storage means and
  information concerning the multimedia content of said unit.

It is thus possible to browse within the temporary storage means easily to identify the selected units.

Advantageously, the hierarchically organized units are representative of the narrative units structure of the video.

In practice, users normally rely on the video content to select the preferred moments and not, for example, on elapsed time criteria, which does not preclude from the context of this invention relying on units according to time elapsed from the start of the video and so being able to browse in time.

In a preferred embodiment, the segmentation means are designed to segment the programmes according to informative data received with the programmes.

Certain transmission or encoding modes can be used to associate and transmit informative data, also called metadata, with the video content. In this case, this metadata is extracted from the video data and provides for rapid segmentation of the video if it includes information on the structure of the video. This, for example, may be the case with certain televised broadcasts for which the metadata is extracted in the post-production studio.

In a preferred embodiment, the segmentation means are designed to segment the programmes according to their content.

Preferably, the segmentation means for segmenting the programmes comprise:
  means of breaking down each received programme into shots,
  means of extracting at least one key image relating to each shot,
  means of extracting visual attributes for each key image,
  means of grouping the key images into units according to the similarity of the extracted attributes.

Advantageously, the temporary storage means and the permanent storage means are located on the same storage means.

This is interesting in the case of high-capacity permanent storage means in which it is possible to free up space for the temporary storage means.

In a preferred embodiment, the means of selectively transferring one or more units from the temporary storage means to the permanent storage means are designed to receive selection information from a user.

Preferably, the recording device comprises means of detecting the start of a new programme and of resetting the segmentation means on detecting a new programme.

The invention also relates to a method of recording multimedia data received in programme form in temporary storage means designed to continuously record the multimedia data received in programme form and permanent storage means, comprising a step for selectively transferring programmes from the temporary storage means to the permanent storage means, characterized in that it comprises:
  a segmentation step for automatically segmenting the received programmes into units,
  a step for selectively transferring one or more units from the temporary storage means to the permanent storage means.

BRIEF DESCRIPTION OF THE DRAWINGS

The invention will be better understood and illustrated by means of exemplary embodiments and advantageous implementations, by no means limiting, with reference to the appended figures in which.

DETAILED DESCRIPTION

Figure 1:
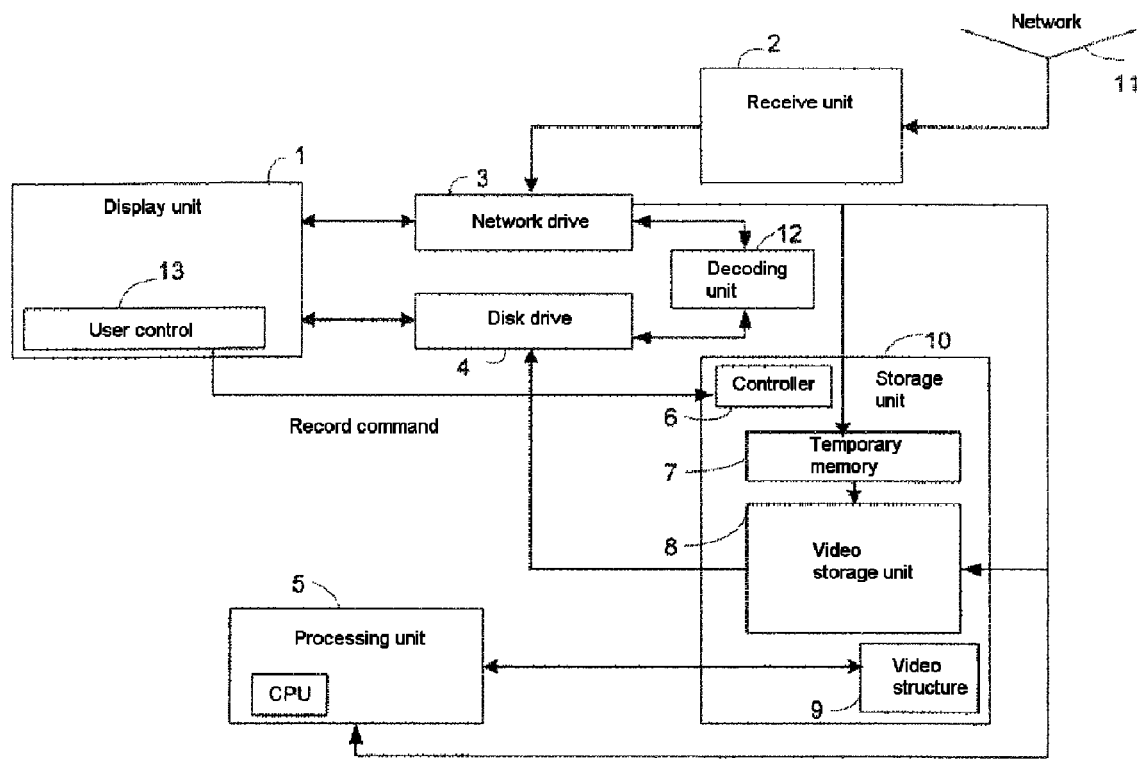
FIG. 1 represents an exemplary device according to the invention.

The modules represented are functional units, which may or may not correspond to physically distinguishable units. For example, these modules, or some of them, may be combined in a single component, or form functionalities of one and the same software. Conversely, certain modules may, if necessary, comprise separate physical entities.

A device suitable for implementing the method is, for example, a receiver/decoder according to the DVB specifications. It uses an ISO/IEC 13818-1 transport layer.

A display unit 1 comprises a user interface 13 in the form of a remote control, enabling the user to transmit commands to a network drive 3, to a disk drive 4 and to a controller 6.

The user interface 13 can, in other embodiments, be different from a remote control and, for example, be a keyboard, a screen or any other device enabling a user to receive or enter data.

The display unit also comprises a display screen, not shown, for viewing the received video programmes.

A receive unit 2 is linked to a network 11. The network 11 is a cable, satellite or any other available video transmission type network. The receive unit demodulates the signal and demultiplexes the streams in order to reconstruct the stream corresponding to the programme selected by the user.

The network drive 3 is linked to the output of the receive unit 2. The network drive 3 receives the video programmes from the receive unit and transmits them to the display unit.

A decoding unit 12 connected to the network drive 3 decompresses the digital stream received from the receive unit 2 to reconstruct the pixels forming the images of the selected programme. These images are redirected by the network drive 3 to the display unit 1 for display on screen, or to the storage unit 10 for storage and/or segmentation of the programme.

A storage unit 10 comprises a controller 6 and storage means partitioned into a number of areas assigned:

To a temporary recording storage memory 7. It is in fact a cache or temporary buffer.
To the permanent storage of the video content (8).
To the storage of metadata describing the segmentation of the current programme (9).

In the preferred embodiment, the storage means comprise a hard disk. In other embodiments, a DVD player/recorder or any other storage means for recording video data can be used. In other embodiments, the storage means 7, 8 and 9 may be physically different units. The temporary memory 7 and the video structure memory 9 may, for example, be implemented using RAM type memory whereas the video storage unit 8 comprises a hard disk.

The controller 6 is used to transfer the data from the video storage unit 8 to the temporary storage memory 7 at the request of the user received via the user interface 13.

The programme is segmented by a processing unit 5. The processing unit 5 is implemented in the form of a processor. In other embodiments, this processing unit 5 can be implemented in the form of a programmable circuit dedicated or not to segmentation.

The device according to FIG. 1 operates in two modes, normal mode and retroactive recording mode.

Figure 2:
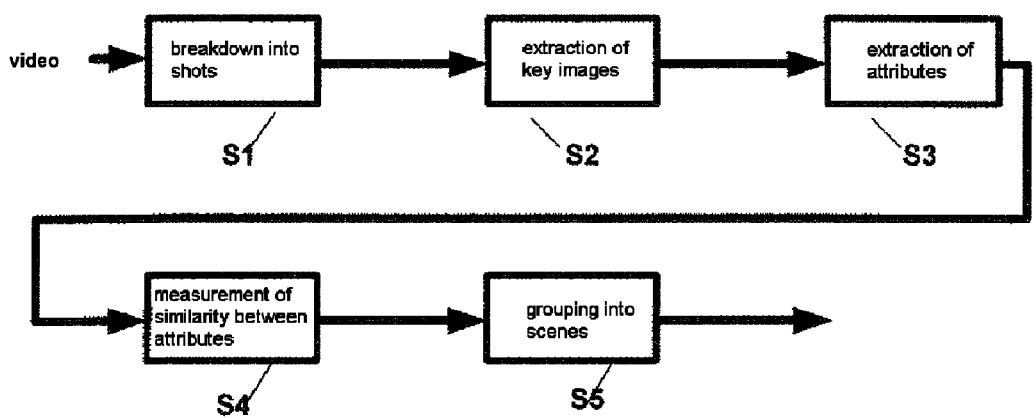
FIG. 2 represents an embodiment of a segmentation method as implemented in the invention.

There now follows a description of these two modes with reference to FIGS. 1 and 2.

Normal Mode

The normal mode corresponds to a mode of operation in which the data is received from the network 11 and transmitted to the display unit 1 so that the user can view it directly, as in a conventional television.

The programme is chosen by the user via his remote control as in any known television device.

In this mode, compared to conventional television operation, the data is also transmitted to the storage unit 10. The decoded video stream is recorded continuously in the temporary storage memory 7 which is designed as a circular buffer: when it becomes full, the oldest memory pages are overwritten and replaced by the new data. This temporary storage memory must be dimensioned to be able to contain all of a long broadcast transmitted at a high bit rate.

When a new programme is received, the processing unit 5 analyses the structure of the received programme immediately it starts being received. The segmentation method implemented in the processing unit 5 is described in FIG. 2.

The segmentation method is applied from the start of reception of a programme and therefore enables it to be segmented as it is received.

In a second embodiment, the segmentation method implemented and described in FIG. 2 can be applied only when reception of a programme has finished. In this other embodiment, the method is not executed if the user changes programme before the reception of the programme is finished.

The segmentation information is recorded in the video structure memory 9 as it is constructed.

Programme start and end indicators are normally transmitted in the received data stream so that the electronic programme guide can be generated and displayed on the receiver. This is in particular the case for programmes according to the DVB standard, where the programme start and end information is transmitted in the event information tables of the DVB SI (service information) sections.

These programme start and end indicators are used by the processing unit 5 to stop, then reset the segmentation method at each end of transmission.

The segmentation information recorded in the video structure memory 9 is represented in the form of an array of records, each record comprising:

an identifier of the segment within the current transmission, which encodes both the level and the positioning of the segment in the structural hierarchy,
a pointer in the temporary storage memory 7 defining the segment start address,
a pointer in the temporary storage memory 7 defining the segment end address,
a textual description of the content of the segment if the latter is supplied as metadata received with the programme.

Retroactive Recording Mode.

In this operating mode, the user wants to record in permanent memory, all or some of the programme that he has viewed or is viewing.

The segmentation information is generated by the processing unit 5 as indicated in the normal mode.

From this segmentation information, structure information is generated and transmitted to the user control 13. This structure information is information that can be understood by the user interface 13.

The structure information is transmitted to the user interface 13 via the disk drive 4 as it is constructed by the processing unit 5 when the segmentation method is implemented.

In another embodiment, the structure information is not transmitted until the end of the programme when the segmentation program is run.

The user can view various types of information according to the type of interface available.

When the user interface 13 comprises a remote control, function buttons such as "+" or "−" can be used to select a level of granularity of the hierarchical structure breakdown into narrative units of the video programme.

When the user interface is more comprehensive and has a keyboard, the selection of the units is simpler for the user who can select the required narrative units using a cursor.

The presence of a screen on the user interface 13 also facilitates this interface and can be used to provide an outline display of the content of the units in semantic terms when this data is generated by the segmentation program.

When viewing a programme, the user can, at any time, initiate retroactive recording by selecting the level of granularity of the section that he wants to record (all of the document or section of level k in the hierarchical structure), then pressing the "retroactive record" button on his remote control. The selection information is transmitted to the controller 6 which then orders the transfer of the units selected permanently in the video storage unit 8 by using the segmentation information present in the memory 9. The system searches therein for the address pointers corresponding to the start and end of the current segment, defined by the selected granularity level.

In another mode of operation, the user is prompted at the end of reception of a programme by a message appearing on the screen, asking if he wants to record some or all of the programme in the permanent storage memory.

When the selected units are transmitted from the temporary storage memory 7 to the storage unit 8, the continuous recording of the new data received from the network continues in parallel in the temporary memory 7.

The segmentation can also be applied to documents permanently recorded previously in the video storage unit 8. This is particularly useful when the user records a programme in the video storage unit without watching it. If this programme is of partial interest to him, he can then ask to retain only those parts in which he is interested and, in this case, he asks, via the user interface, the processing unit 5 to segment the programme. The user interface 13 includes a button for ordering the segmentation of a programme recorded in the video storage unit. This segmentation is recorded in the video structure memory 9 and the user accesses it via his remote control 13 and asks the controller 6 to store in permanent memory 8 the units that he wants to retain. He can then delete the programme that he had previously recorded in its entirety.

The user interface also constitutes a new feature compared to existing remote controls. In practice, this user interface is designed for browsing within the video. It applies in particular to the present invention but can equally be used to browse in the video not to record it on a permanent storage means but also to play it back subsequently and view it for example. In practice, a user may want to watch his preferred tennis match again, but only the winning points of his favorite player. He then runs the segmentation program by the segmentation button on the user interface 13 on his tennis match. When the segmentation is done, the processing unit 5 sends to the controller 6 the end of segmentation information. This information is referred on to the user interface 13. The user can then choose a display mode via his user interface 13 and view the winning points of his favorite player by selecting, with the buttons of his remote control, the winning points as they occur, for example via the "+" or "−" buttons for viewing subsequent or preceding points.

FIG. 2 describes a method of segmenting the video programme received and implemented in the processing unit.

A number of hierarchical segmentation approaches exist for segmenting a video document into semantic units.

The main phases of these algorithms are given in FIG. 2.

First of all, the video is divided into shots (step S1), the shots corresponding to shot transitions.

There are various methods for breaking down a video into shots. Such a method is in particular described in the French patent application 0213978, filed on 28 Oct. 2002 on behalf of Thomson Licensing SA. This application also describes the extraction of key images for each shot. One or more key images can be extracted from each shot (step S2), this being dependent on the movement quality of the shot, a shot presenting strong movements being able to be characterized by more than one key image.

Next, the key images are grouped according to their similarity (step S4).

The similarity is calculated by a distance measurement between images. The distance measurement between images is based on the distance between attributes F. The attributes F are extracted in the step S3.

F is representative of a characteristic of the image chosen, by way of illustration and as a non-limiting example, from the texture or colour. As an alternative, the dominant coefficients of the transformation into wavelets can also be considered as an attribute.

Various attribute computation methods exist and are well known to those skilled in the art.

The computed distance D can be defined by a Euclidian metric as an illustration. Advantageously, this metric includes a temporal component which weights the similarity between images according to the temporal proximity of the shots that they represent, the similarity being that much greater as the shots are closer together.

The application of an algorithm for automatically clustering data in the space of the attributes can be used to group images, and therefore the associated shots, into "scenes" (step S5). These scenes normally provide a good approximation of the structure of the content in narrative units.

Of course, such a method is applied more particularly to video programmes for which the structure allows a hierarchical breakdown. Typically, a tennis match supports such a breakdown into points, games, sets and matches, with also the time-outs and rest periods that are also detected.

Such a breakdown method is, for example, described in the U.S. Pat. No. 5,708,767 filed on 3 Feb. 1995 on behalf of "The Trustees of Princeton University".

The video programme is therefore broken down into narrative units and the segmentation information is transmitted to the video structure memory 9.

In other embodiments, the segmentation information is transmitted as metadata accompanying the video programme, for example in accordance with the multimedia content description standard MPEG-7. The segmentation information is then decoded with the video data and recorded in the video structure memory 9.

The invention claimed is:

1. A device for recording multimedia data received in programme form comprising temporary storage means designed to record continuously the multimedia data received in programme form and permanent storage means, comprising means of selectively transferring programmes from the temporary storage means to the permanent storage means, the device comprising:
   segmentation means for segmenting the received programmes into units according to their content,
   means of selectively transferring one or more units from the temporary storage means to the permanent storage means;
      wherein said segmentation means further comprises:
         means of breaking down each received programme into shots,
         means of extracting at least one key image relating to each shot,
         means of extracting visual attributes for each key image,
         means of grouping the key images into units according to the similarity of the extracted attributes.

2. The device of claim 1, wherein the segmentation means segments the programmes into hierarchically organized units.

3. The device of claim 1, wherein the segmentation means generates, for each unit, segmentation information comprising:
   a start address and an end address of the unit in the temporary storage means; and
   information concerning the multimedia content of said unit.

4. The device of claim 2, wherein the hierarchically organized units are representative of narrative units structure of the video.

5. The device of claim 1, wherein the segmentation means segments the programmes according to informative data received with the programmes.

6. The device of claim 1, wherein the temporary storage means and the permanent storage means are located on the same storage means.

7. The device of claim 1, wherein the means of selectively transferring one or more units from the temporary storage means to the permanent storage means are configured to receive selection information from a user.

8. The device of claim 1 further comprising means of detecting a start of a new programme and of resetting the segmentation means upon detecting a new programme.

9. A method of recording multimedia data received in programme form in temporary storage means configured to continuously record the multimedia data received in programme form, comprising a step for selectively transferring programmes from the temporary storage means to permanent storage means, wherein the method comprises the steps of:
   segmenting the received programmes into units according to their content,
   selectively transferring one or more units from the temporary storage means to the permanent storage means,
      wherein said segmenting further comprises the steps of:
   breaking down each received programme into shots,
   extracting at least one key image relating to each shot,
   extracting visual attributes for each key image, and
   grouping the key images into units according to the similarity of the extracted attributes.

* * * * *